(12) United States Patent
Turnquist et al.

(10) Patent No.: US 12,281,483 B2
(45) Date of Patent: Apr. 22, 2025

(54) SYSTEM AND METHOD FOR MANUFACTURING A TOWER STRUCTURE

(71) Applicant: General Electric Company, Schenectady, NY (US)

(72) Inventors: Norman Arnold Turnquist, Sloansville, NY (US); Xiaopeng Li, Niskayuna, NY (US); Gregory Edward Cooper, Greenfield Center, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 217 days.

(21) Appl. No.: 17/778,081

(22) PCT Filed: Nov. 22, 2019

(86) PCT No.: PCT/US2019/062733
§ 371 (c)(1),
(2) Date: May 19, 2022

(87) PCT Pub. No.: WO2021/101558
PCT Pub. Date: May 27, 2021

(65) Prior Publication Data
US 2022/0412107 A1    Dec. 29, 2022

(51) Int. Cl.
*B29C 64/00*       (2017.01)
*E04G 11/22*       (2006.01)
(Continued)

(52) U.S. Cl.
CPC .......... *E04G 21/0463* (2013.01); *B29C 64/00* (2017.08); *E04G 11/22* (2013.01);
(Continued)

(58) Field of Classification Search
CPC ................................ B63B 21/27; B33Y 10/00
See application file for complete search history.

(56) References Cited

U.S. PATENT DOCUMENTS 3,516,129 A    6/1970  Yoder
3,841,356 A *  10/1974 James ...................... F16L 9/08
                                                      138/175
(Continued)

FOREIGN PATENT DOCUMENTS

CN    106592980 A    4/2017
CN    108191360 A    6/2018
(Continued)

OTHER PUBLICATIONS

The foreign Office Action and English translation for CN application No. 201980102372.6, Apr. 29, 2023, 9 pages.
(Continued)

*Primary Examiner* — Nicholas R Krasnow
(74) *Attorney, Agent, or Firm* — Dority & Manning, P.A.

(57) ABSTRACT

A system and method are provided for manufacturing a tower structure. Accordingly, an interlocking form ring is additively manufactured with a first printhead assembly. The interlocking form ring defines a plurality of recesses in a radially inner or a radially outer face. A cementitious material is deposited within one or more of the recesses with a second printhead assembly. At least one reinforcing member is positioned within the recess with the second printhead assembly. The second printhead assembly is positioned adjacent to the cementitious material during the curing thereof so as to provide a slip form for the curing of the cementitious material.

13 Claims, 7 Drawing Sheets

(51) Int. Cl.
| | |
|---|---|
| *E04G 21/04* | (2006.01) |
| *E04H 12/12* | (2006.01) |
| *E04H 12/34* | (2006.01) |
| *B33Y 10/00* | (2015.01) |
| *B33Y 30/00* | (2015.01) |
| *B33Y 80/00* | (2015.01) |

(52) U.S. Cl.
CPC ........... *E04H 12/12* (2013.01); *E04H 12/341* (2013.01); *B33Y 10/00* (2014.12); *B33Y 30/00* (2014.12); *B33Y 80/00* (2014.12); *E04G 2021/049* (2013.01)

(56) References Cited

U.S. PATENT DOCUMENTS

| | | | |
|---|---|---|---|
| 5,356,687 A * | 10/1994 | Suenaga | E06B 1/24 428/81 |
| 8,778,479 B2 | 7/2014 | Bech | |
| 9,331,534 B2 | 5/2016 | Yost | |
| 9,375,861 B2 | 6/2016 | Schibsbye | |
| 9,388,598 B2 | 7/2016 | Stiesdal | |
| 11,021,887 B2 | 6/2021 | Keller et al. | |
| 2010/0257792 A1 | 10/2010 | Khoshnevis | |
| 2011/0041733 A1 | 2/2011 | Bartl et al. | |
| 2012/0159785 A1 | 6/2012 | Pyles et al. | |
| 2015/0083422 A1* | 3/2015 | Pritchard | E21B 33/13 166/292 |
| 2015/0252582 A1* | 9/2015 | Stiesdal | E04H 12/12 52/378 |
| 2015/0300036 A1 | 10/2015 | Khoshnevis | |
| 2015/0367375 A1 | 12/2015 | Page | |
| 2017/0016244 A1* | 1/2017 | Keller | E04G 21/0463 |
| 2017/0129153 A1 | 5/2017 | Koivuharju | |
| 2017/0225445 A1 | 8/2017 | Gardiner | |
| 2017/0305034 A1 | 10/2017 | Grivetti et al. | |
| 2018/0071949 A1 | 3/2018 | Giles | |
| 2020/0181014 A1* | 6/2020 | Rahman | C04B 24/2641 |
| 2022/0032497 A1 | 2/2022 | Turnquist et al. | |
| 2022/0154550 A1* | 5/2022 | Boul | B29C 64/386 |

FOREIGN PATENT DOCUMENTS

| | | |
|---|---|---|
| CN | 208309837 U | 1/2019 |
| EP | 1711328 B1 | 3/2013 |
| EP | 2735674 A1 | 5/2014 |
| EP | 3118394 A1 | 1/2017 |
| GB | 2525400 A | 10/2015 |
| KR | 101681544 B1 | 12/2016 |
| WO | WO 017/9131 A1 | 10/2001 |
| WO | WO2005/070657 A1 | 8/2005 |
| WO | WO2013/120889 A1 | 8/2013 |
| WO | WO2016/019434 A1 | 2/2016 |
| WO | WO2016/055222 A1 | 4/2016 |
| WO | WO2017/092766 A1 | 6/2017 |
| WO | WO2019/057267 A1 | 3/2019 |

OTHER PUBLICATIONS

PCT International Search Report & Opinion Corresponding to PCT/US2019/062733 on Jul. 22, 2020.
Abdollahnejad et al., Comparative Study on the Effects of Recycled Glass-Fiber on Drying Shrinkage Rage and Mechanical Properties of the Self-Compacting Mortar and Fly Ash-Slag Geopolymer Mortar, Journal of Materials in Civil Engineering, vol. 29, No. 8, Aug. 2017. (Abstract Only) https://ascelibrary.org/doi/full/10.1061/%28ASCE%29MT.1943-5533.0001918.
Apis Cor, Laying Down Framework and Walls, Apr. 6, 2016. (Weblink Only) https://www.youtube.com/watch?v=ViqzfPW6TFo.
Bank et al., Concepts for Reusing Composite Materials from Decommissioned Wind Turbine Blades in Affordable Housing, Recycling, vol. 3, 2018, 11 Pages. https://www.mdpi.com/2313-4321/3/1/3/pdf.
Bank, Opportunities for Recycling and Reuse of FRP Composites for Construction in a Circular Economy, 2018, 19 Pages. https://static1.squarespace.com/static/5b324c409772ae52fecb6698/t/5b742fa48a922ddaec973ffd/1534341041431/Bank|CICE|2018|Keynote|FINAL.pdf.
Bos et al., Experimental Exploration of Metal Cable as Reinforcement in 3D Printed Concrete, MDPI, Journals, Materials, vol. 10, Issue 11, 2017, 1314, 22 Pages. https://doi.org/10.3390/ma10111314.
FHWA, Chapter 8—Rebar Cages, Drilled Shafts: Construction Procedures by FHWA, PileBuck, Jun. 29, 2016, 11 Pages. http://www.pilebuck.com/drilled-shafts-construction-procedures-fhwa/chapter-8-rebar-cages/.
Fox, Recycling Wind Turbine Blade Composite Material as Aggregate in Concrete, Thesis, Iowa State University, 2016, 57 Pages. https://www.imse.iastate.edu/files/2014/03/Fox-Tyler-Recycling-wind-turbine-blade-composite-material-as-aggregate-in-concrete.pdf.
Gosselin et al., Large-Scale 3D Printing of Ultra-High Performance Concrete—A New Processing Route for Architects and Builders, Materials & Design, vol. 100, Jun. 15, 2016, pp. 102-109.
Irving, 3D Printed Reinforced Concrete Bridge Opens in the Netherlands, New Atlas, Architecture, Oct. 17, 2017, 8 Pages. https://newatlas.com/3d-printed-concrete-bridge/51796/.
Kimm et al., Investigation of Surface Modification and Volume Content of Glass and Carbon Fibres from Fibre Reinforced Polymer Waste for Reinforcing Concrete, Journal of Hazardous Materials, vol. 390, Dec. 2019. (Abstract Only) https://www.sciencedirect.com/science/abs/pii/S0304389419317510.
Mechtcherine et al., 3D-Printed Steel Reinforcement for Digital Concrete Construction—Manufacture, Mechanical Properties and Bond Behaviour, ScienceDirect, Construction and Building Materials, vol. 179, No. 10, Aug. 10, 2018, pp. 125-137. (Abstract Only) https://doi.org/10.1016/j.conbuildmat.2018.05.202.
Molitch-Hou, 400-Square-Meter Villa 3D Printed Onsite in Just 45 Days, Engineering.com, 3D Printing, Jun. 2016. https://www.engineering.com/story/400-square-3d-printed-onsite-in-just-45-days.
Novais et al., Effective Mechanical Reinforcement of Inorganic Polymers Using Glass Fibre Waste, Journal of Cleaner Production, vol. 166, Jul. 31, 2017, pp. 343-349. (Abstract Only) https://www.sciencedirect.com/science/article/abs/pii/S0959652617316992.
Novais et al., Incorporation of Glass Fibre Fabrics Waste into Geopolymer Matrices: An Eco-Friendly Solution for Off-Cuts Coming from Wind Turbine Blade Production, Construction and Building Materials, vol. 187, Oct. 30, 2018, pp. 876-883. (Abstract Only) https://www.sciencedirect.com/science/article/abs/pii/S0950061818319445.
Quigley, A Few Ways to Strengthen 3D Printed Parts, www.3ders.org, 3D Printer and 3D Printing News, Oct. 10, 2014. http://www.3ders.org/articles/20141010-a-few-ways-to-strengthen-3d-printed-parts.html.
Saccani et al., Composites Obtained by Recycling Carbon Fibre/Epoxy Composite Wastes in Building Materials, Construction and Building Materials, vol. 204, Apr. 20, 2019, pp. 296-302. (Abstract Only) https://www.sciencedirect.com/science/article/abs/pii/S0950061819302466.
SIEMENS Gamesa, Sustainability Report 2017, Renewable Energy, 49 Pages. https://www.siemensgamesa.com/en-int/-/media/siemensgamesa/downloads/en/investors-and-shareholders/corporate-governance/general-shareholders-meetings/2018/documentations/is-2017-eng.pdf.
Veolia, How Can Wind Turbine Blades Be Recycled, Living Circular. (Web Link Only) https://www.livingcircular.veolia.com/en/industry/how-can-wind-turbine-blades-be-recycled.
Yazdanbakhsh et al., Mechanical Processing of GFRP Waste into Large-Sized Pieces for Use in Concrete, MDPI Recycling, vol. 3, Issue 8, 2018, 11 Pages. https://pdfs.semanticscholar.org/543d/5172927ee0b6999bd6d415303fa8ba61a186.pdf.
Zareiyan et al., Effects of Interlocking on Interlayer Adhesion and Strength of Structures in 3D Printing of Concrete, Automation in Construction, vol. 83, Nov. 2017, pp. 212-221. https://www.

(56) References Cited

OTHER PUBLICATIONS researchgate.net/publication/319162312_Effects_of_interlocking_on_interlayer_adhesion_and_strength_structures_in_3D_printing_of_concrete.

* cited by examiner

500 ─┐

┌─────────────────────────────────────────────────────────────────┐
│ DEPOSITING ONE OR MORE LAYERS OF AN INTERLOCKING FORM RING WITH A FIRST │─ 502
│ PRINTHEAD ASSEMBLY, THE INTERLOCKING FORM RING DEFINING A PLURALITY OF │
│ RECESSES IN AT LEAST ONE OF A RADIALLY INNER FACE OR A RADIALLY OUTER │
│ FACE, THE FIRST PRINTHEAD ASSEMBLY INCLUDING, AT LEAST, A FIRST PRINTHEAD │
│ ORIENTED IN A FIRST DIRECTION; │
└─────────────────────────────────────────────────────────────────┘

┌─────────────────────────────────────────────────────────────────┐
│ DEPOSITING A CEMENTITIOUS MATERIAL WITHIN ONE OR MORE OF THE PLURALITY │─ 504
│ OF RECESSES WITH A SECOND PRINTHEAD ASSEMBLY SO AS TO FORM AT LEAST ONE │
│ OF AN INNER TOWER WALL OR AN OUTER TOWER WALL, THE SECOND PRINTHEAD │
│ ASSEMBLY INCLUDING A SECOND PRINTHEAD ORIENTED IN A SECOND DIRECTION, │
│ THE SECOND DIRECTION BEING DIFFERENT THAN THE FIRST DIRECTION; │
└─────────────────────────────────────────────────────────────────┘

┌─────────────────────────────────────────────────────────────────┐
│ POSITIONING AT LEAST ONE REINFORCING MEMBER AT LEAST PARTIALLY │─ 506
│ WITHIN THE RECESS WITH THE SECOND PRINTHEAD ASSEMBLY; AND │
└─────────────────────────────────────────────────────────────────┘

┌─────────────────────────────────────────────────────────────────┐
│ POSITIONING AN ARTICULABLE FORMING ELEMENT OF THE SECOND PRINTHEAD │─ 508
│ ASSEMBLY ADJACENT TO THE CEMENTITIOUS MATERIAL DURING CURING THEREOF │
│ SO AS TO PROVIDE A SLIP FORM FOR THE CURING OF THE CEMENTITIOUS MATERIAL. │
└─────────────────────────────────────────────────────────────────┘

FIG. 8

SYSTEM AND METHOD FOR MANUFACTURING A TOWER STRUCTURE

RELATED APPLICATIONS

The present application claims priority to PCT Application Serial Number PCT/US2019/062733, filed on Nov. 22, 2019, which is incorporated by reference herein.

FIELD

The present disclosure relates in general to tower structures, and more particularly to systems and methods for additively manufacturing a tower structures, such as for supporting wind turbines.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

Tower structures, and in particular wind turbine towers, are often constructed of steel tubes, pre-fabricated concrete sections, or combinations thereof. Further, the tubes and/or concrete sections are typically formed off-site, shipped on-site, and then arranged together to erect the tower. For example, one manufacturing method included forming pre-cast concrete rings, shipping the rings to the site, arranging the rings atop one another, and then securing the rings together. As tower heights increase, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting and/or welding. Such methods, however, require extensive labor and can be time-consuming.

Thus, the art is continuously seeking new and improved methods for manufacturing towers. Accordingly, the present disclosure is directed to systems and methods for manufacturing towers that address the aforementioned issues. In particular, the present disclosure is directed to methods for additively manufacturing the tower structures on-site using automated additive printing devices mounted to a vertical support structure.

BRIEF DESCRIPTION

Aspects and advantages of the invention will be set forth in part in the following description, or may be obvious from the description, or may be learned through practice of the invention.

In one aspect, the present disclosure is directed to a method for manufacturing a tower structure. The method may include depositing one or more layers of an interlocking form ring with a first printhead assembly. The interlocking form ring may define a plurality of recesses in at least one of a radially inner face or a radially outer face. The first printhead assembly may include, at least, a first printhead oriented in a first direction. The method may include depositing a cementitious material within one or more of the plurality of recesses with a second printhead assembly so as to form at least one of an inner tower wall or an outer tower wall. The second printhead assembly may include a second printhead oriented in a second direction with the second direction being different than the first direction. The method may also include positioning at least one reinforcing member at least partially within a recess of the plurality of recesses with the second printhead assembly. Further, the method may include positioning an articulable forming element of the second printhead assembly adjacent to the cementitious material during curing thereof so as to provide a slip form for the curing of the cementitious material.

In an embodiment, the method may also include defining the plurality of recesses in the radially inner face of the interlocking form ring and the radially outer face of the interlocking form ring.

In an embodiment, the method may also include simultaneously depositing the cementitious material at least partially within one or more of the plurality recesses with a third printhead assembly. The third printhead assembly may be disposed radially opposite the second printhead assembly. The third printhead assembly may include a third printhead oriented in the second direction.

In an additional embodiment, positioning the at least one reinforcing member may also include positioning the at least one reinforcing member with a reinforcement module synchronized with the second printhead. The second printhead assembly may be coupled to a support arm via an articulable joint.

In an embodiment, depositing the cementitious material within the one or more plurality of recesses may also include depositing the cementitious material with a plurality of deposition nozzles of the second printhead. In such embodiments, each nozzle of the plurality of deposition nozzles may be independently articulable.

In an embodiment, the method may also include simultaneously depositing the cementitious material and the at least one reinforcing member in each of at least two recesses of the plurality of recesses.

In a further embodiment, depositing one or more layers of the interlocking form ring may also include depositing one or more layers of a form material having a first cure rate. In such embodiments, the cementitious material may have a second cure rate the first cure rate may be different than the second cure rate.

In an embodiment, one or more of the plurality of recesses may also include dovetail cross-sectional shape. In an embodiment, positioning the at least one reinforcing member may include depositing at least one of a wire, cable, ribbon, or microfiber from a coil supported by a reinforcement module of the second printhead assembly.

In an additional embodiment, the method may include applying a force to the at least one reinforcement member so as to tension the at least one reinforcement member.

In an embodiment, the method may further include sealing at least one of the radially inner face or the radially outer face of the interlocking form ring with the cementitious material.

In an embodiment, the tower structure may be part of a wind turbine.

In another aspect, the present disclosure is directed to an additive printing device for manufacturing a tower structure. The additive printing device may include a support structure. The additive printing device may also include a first printhead assembly operably coupled to the support structure. The first printhead assembly may include a first printhead oriented in a first direction to deposit one or more layers of an interlocking form ring. The interlocking form ring may define a plurality of recesses in at least one of a radially inner face or a radially outer face. The device may also include a second printhead assembly oriented to simultaneously deposit a cementitious material and at least one reinforcing member at least partially within one or more recesses of the plurality of recesses. The cementitious material may form at least one of an inner tower wall or an outer tower wall. The second printhead assembly may include a second printhead oriented in a second direction. The second printhead may include an articulable forming element positioned so as to provide a slip-form during the curing of the cementitious material. The second printhead assembly may also include a reinforcement module synchronized with the second printhead and configured to embed at least one reinforcing member at least partially within the recess of the plurality of recesses.

In an embodiment, the additive printing device may also include a third printhead assembly including a third printhead oriented in a generally horizontal direction to simultaneously deposit the cementitious material within one or more of the plurality of recesses. The cementitious material may form the inner tower wall. The third printhead assembly may be disposed radially opposite the second printhead assembly.

In an embodiment, the additive printing device may also include a fourth printhead assembly operably coupled to the support structure. The fourth printhead assembly may include a fourth printhead oriented in a first direction to deposit one or more layers of the interlocking form ring. The fourth printhead may be disposed radially opposite the first printhead assembly.

It should be understood that the system may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 illustrates a flow diagram of one embodiment of a method for controlling a wind farm connected to an electrical grid according to the present disclosure.

Figure 1:
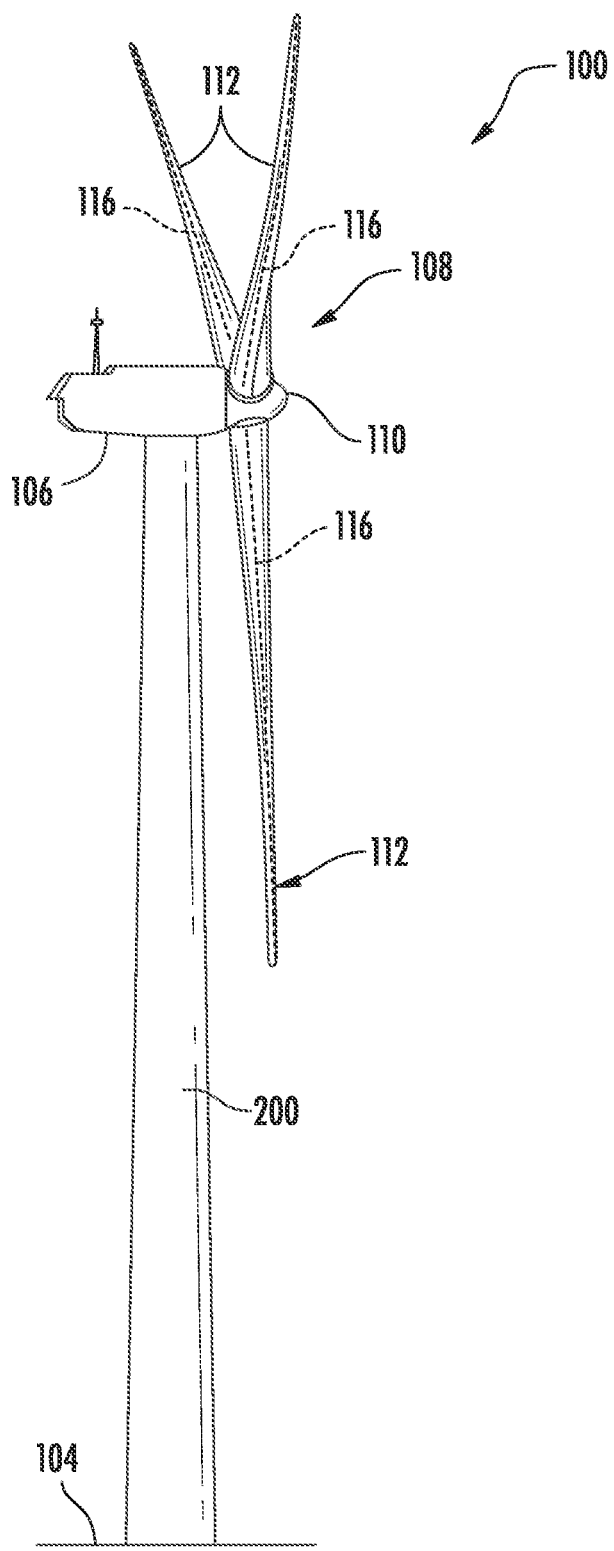
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to an additive printing device and methods for manufacturing a tower structure, such as a wind turbine tower. In particular, the present disclosure may include utilizing at least a first and a second printhead assembly to manufacture the tower via additive manufacturing. The present disclosure may include printing an interlocking form ring with the first printhead assembly. The first printhead assembly may include a first printhead oriented in a first direction so that the interlocking form ring is generally formed from the bottom up by layering a new layer of material on top of the previously deposited layer. The interlocking form ring may define a number of recesses in at least one of a radially inner face or a radially outer face of the tower structure. As the interlocking form ring is built, the recesses may align between the layers so as to form a number of vertically oriented or helically oriented pockets in the respective face of the tower structure.

Simultaneously with the printing of the interlocking form ring by the first printhead assembly, a second printhead assembly may be utilized to fill the recesses with a cementitious material and at least one reinforcing member. The second printhead assembly may include a second printhead which may be generally oriented along a horizontal plane. Being oriented in a second direction may permit the second printhead to deposit the cementitious material into the recesses and/or along the inner or outer face of the tower structure. The second printhead assembly may also include a reinforcement module which may be synchronized to the second printhead. In other words, the reinforcement module may, for example, advance up the pockets at the same rate as, but positioned just ahead of, the second printhead so as to place the reinforcing member(s) into the recess defined by the interlocking form ring. The second printhead assembly may also include an articulable forming element coupled to the second printhead. The articulable forming element may provide a slip form during the curing of the cementitious material. As such, the second printhead assembly may insert the reinforcing member into the recess, fill the recess with the cementitious material, and finish the cementitious material such that the resultant surface may require a minimum of additional processing.

Referring now to the drawings, FIG. 1 illustrates a perspective view of an embodiment of a tower structure according to the present disclosure. As depicted in FIG. 1, the tower structure may be a component of a wind turbine 100. As shown, the wind turbine 100 generally includes a tower structure 200 extending from a support surface 104, a nacelle 106, mounted on the tower structure 200, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

It should be appreciated that while discussed herein in reference to a wind turbine tower, the present disclosure is not limited to wind turbine towers but may be utilized in other construction applications. In particular, the present disclosure is applicable to any application having concrete construction and/or tall tower structures. For example, the present disclosure may be utilized in the additive manufacturing of homes, buildings, portions of buildings, bridges, towers, poles, and other aspects of the construction industry. Further, the methods described herein may also apply to manufacturing any similar structure that benefits from the advantages described herein.

Referring now to FIGS. 2, 3, 5, and 7, depictions of multiple embodiments of the tower structure 200 being formed via an additive printing device 300 according to the present disclosure are presented. As shown the tower structure 200 defines a circumferential tower wall 202 having a and inner tower wall 224 and an outer tower wall 226. Further, as shown, the tower wall 202 generally defines a hollow interior 208 that may, in a wind turbine 100, be employed to house various turbine components. In addition, as will be described in more detail below, the tower structure 200 may be formed using additive manufacturing.

In an embodiment, the tower structure 200 may be formed from at least one cementitious material 210 that is reinforced with one or more reinforcing members 212. The reinforcing member(s) 212 may be a wire, a cable, a ribbon, a microfiber, or any combination thereof. The reinforcing member(s) 212 may be embedded in the cementitious material 210 during the printing process, as described in more detail below. As used herein, the cementitious material 210 may include any suitable workable paste that may be configured to bind together after curing to form a structure. Suitable cementitious materials may include, for example, concrete, pitch resin, asphalt, clay, cement, mortar, cementitious compositions, polymer compositions, or other similar materials or compositions. For example, in at least one embodiment, the cementitious material may be a recycled polymer combined with an aggregate.

In at least one embodiment, the tower structure 200 may be formed by depositing one or more layers of an interlocking form ring 214 with the additive printing device 300. The interlocking form ring 214 may define a plurality of recesses 216 in at least one of a radially inner face 206 or a radially outer face 204. In at least one embodiment, the interlocking form ring 214 may define the plurality of recesses 216 and both the radially inner face 206 and the radially outer face 204. In an embodiment, the same number of recesses 216 may be defined in both the radially inner face 206 and the radially outer face 204 and the plurality of recesses 216 may be radially aligned. In at least one embodiment, the one or more recesses 216 may be defined in the radially outer face 204 than in the radially inner face 206. In an additional embodiment, the plurality of recesses 216 defined by the radially outer face 204 and the plurality of recesses 216 defined by the radially inner face 206 may have differing dimensions. It should be appreciated that the alignment and phasing of the plurality of recesses 216 may be variable in count, size, and position.

The plurality of recesses 216 may be formed with a geometry which facilitates the retention of the cementitious material 210 at least partially within each of the recesses 216. For example, the plurality of recesses 216 may be formed with the generally trapezoidal shape or dovetail cross-sectional shape lying on a plane generally perpendicular to a vertical axis (V). In other words, for a recess 216 defined by the radially outer face 204, the recess 216 may include a recess opening 217 having a shorter circumferential length than a maximal recess width 220 of the recess 216. However, in an alternative embodiment, the recess 216 may be generally rectangular and may have a recess opening 217 which is generally the same circumferential length as the maximal recess width 220.

In at least one embodiment, the additive printing device 300 may deposit the radially inner and outer faces 204, 206 while leaving a void therebetween. The void may be subsequently filled. For example, in at least one embodiment, the radially inner and outer faces 204, 206 may serve as a form into which the cementitious material 210, or other similar composition, is poured or printed. In such an embodiment, the radially inner and outer faces 204, 206 may be formed from a polymer or other composition having a relatively short cure time relative to the fill material.

Figure 2:
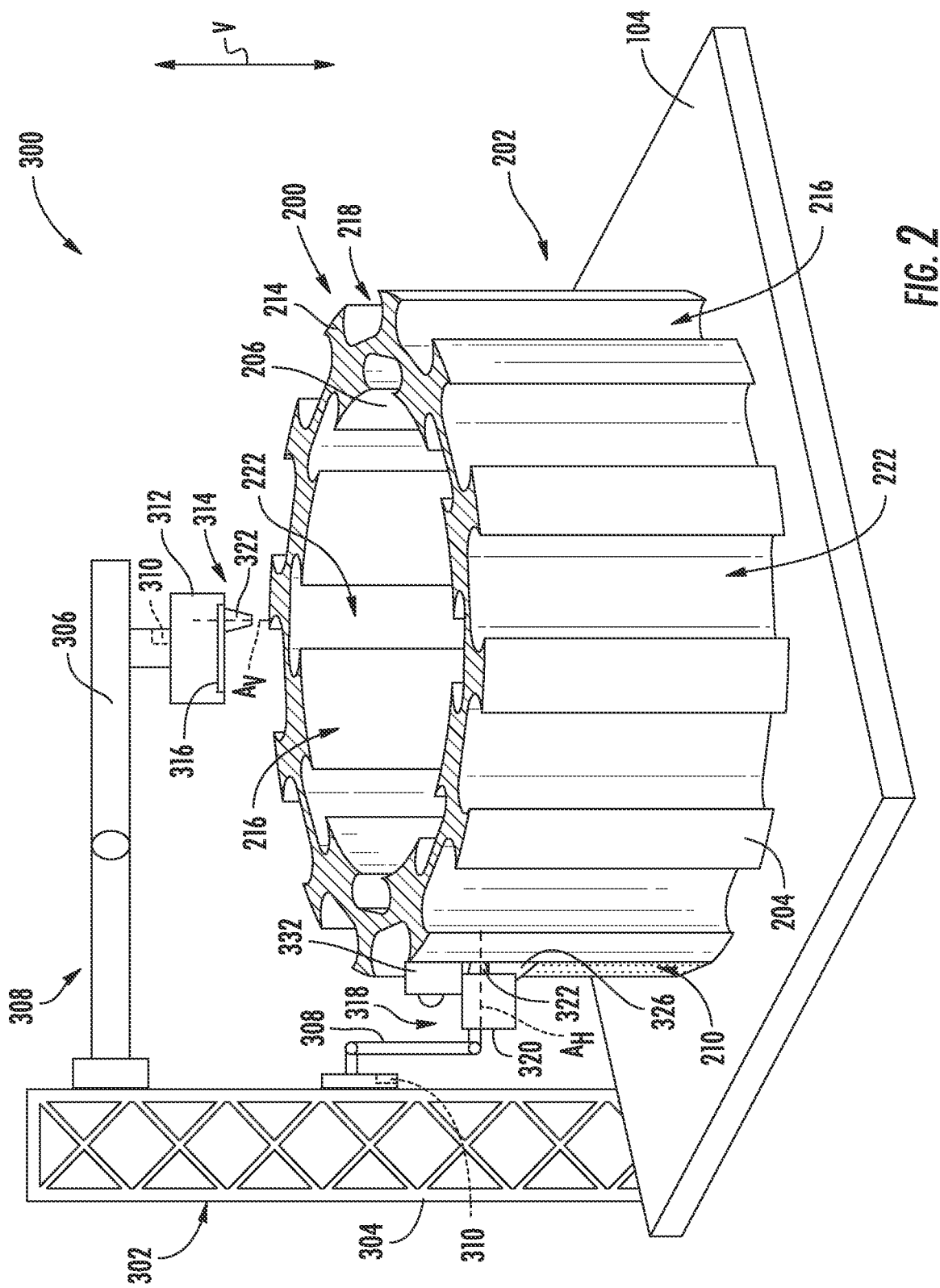
FIG. 2 illustrates a perspective view of one embodiment of a tower and additive printing device for the manufacture thereof according to the present disclosure.

As layers of the interlocking form ring 214 are deposited with the additive printing device 300, the plurality of recesses 216 in each subsequent layer may align to form a plurality of pockets 222. In at least one embodiment, such as depicted in FIG. 2, the plurality of pockets 222 may be vertically oriented. As such, the pockets 222 may extend from the support surface 104, up the tower structure 200 to a desired height. In an alternative embodiment, each layer of the interlocking form ring 214 may be clocked (e.g., rotated) relative to the preceding layer such that subsequent layers of the interlocking form ring 214 are circumferentially displaced relative to the preceding layers of the interlocking form ring 214. The circumferential displacement of the plurality of recesses 216 may result in the plurality pockets 222 forming a plurality of helical pockets circumscribing the interlocking form ring 214.

Referring still to FIGS. 2, 3, 5, and 7, the additive printing device 300 may be configured to deposit the cementitious material 210 within one or more of the plurality of recesses 216 so as to form at least one of an inner tower wall 224 or an outer tower wall 226. In such an embodiment, the interlocking form ring 214, and the pockets 222 thereof, may serve as a form, supporting the cementitious material 210 during a cure phase of the cementitious material 210. In other words, the interlocking form ring 214 may serve as a skeleton to support the cementitious material 210 deposited in the plurality of recesses 216 until the cementitious material 210 has cured and hardened.

In an embodiment, the cementitious material 210 may also form a uniform inner or outer tower wall 224, 226 which encapsulates the interlocking form ring 214. The encapsulation of the interlocking form ring 214 may serve to seal the interlocking form ring 214 so as to isolate the interlocking form ring 214 from at least one environmental condition. In an alternative embodiment, at least a portion of the interlocking form ring 214 may remain as a portion of the inner or outer tower wall 224, 226 after the deposition of the cementitious material 210 within the plurality of recesses 216. It should be appreciated that in such an embodiment, the inner and/or outer tower wall 224, 226 may include portions of both the interlocking form ring 214 and the cementitious material 210.

In an embodiment, the interlocking form ring 214 may be formed from a form material. The form material may be any material suitable for providing at least a temporary support to the cementitious material 210 throughout the curing process of the cementitious material 210. For example, the form material may be a thermoset plastic, a resin, a foam, a cellulose material, a powdered metal, and/or a cementitious material. The form material may have a first cure rate, and the cementitious material 210 may have a second cure rate. The first cure rate may be different than the second cure rate. For example, the first cure rate may be of a shorter duration than the second cure rate. It should be appreciated that the form material having a relatively rapid cure rate may facilitate the interlocking form ring 214 serving as a support upon which to apply the cementitious material 210. It should be further appreciated that the relatively rapid curing of the form material may accelerate the additive manufacturing process of the tower structure 200.

Figure 3:
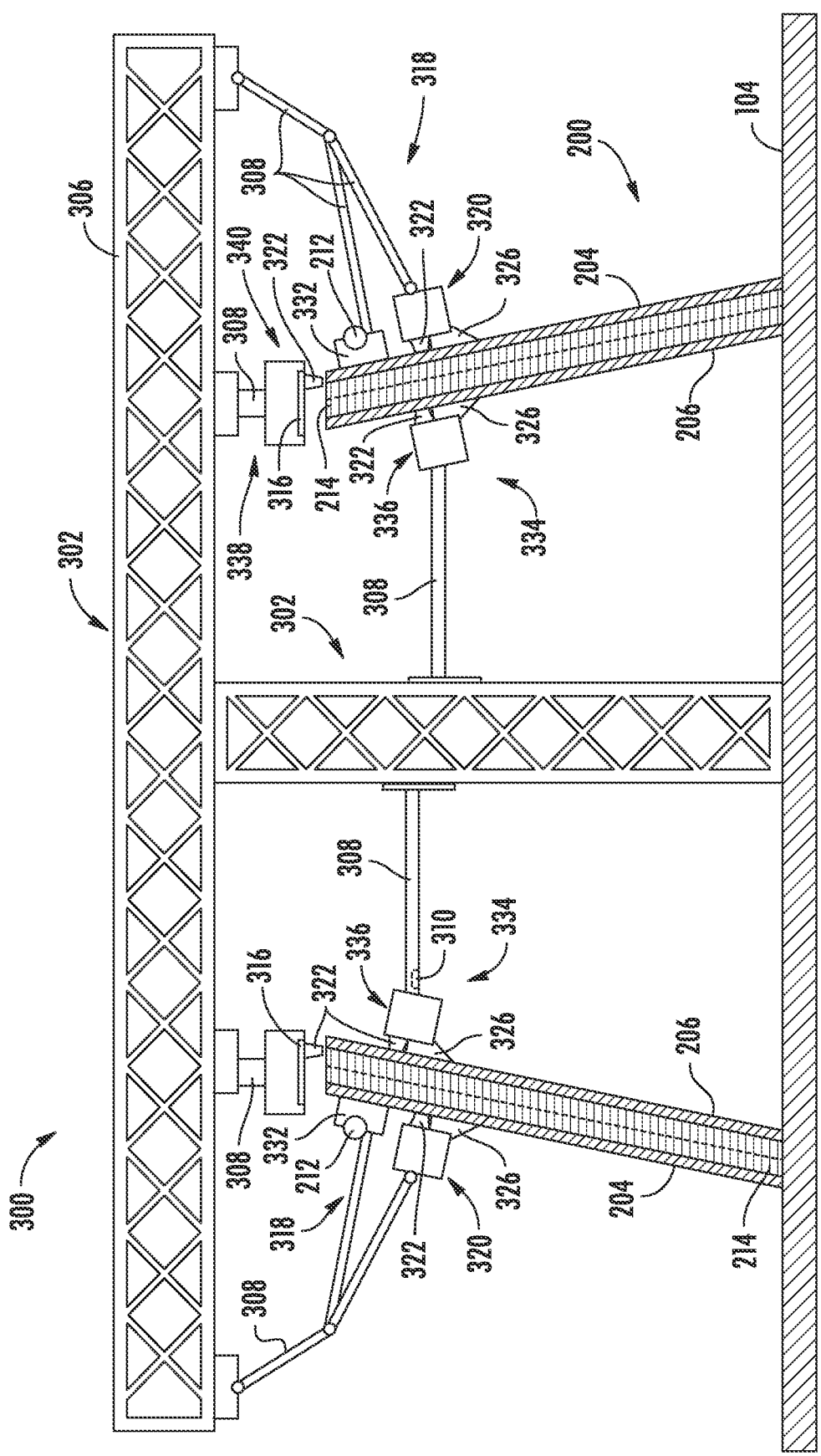
FIG. 3 illustrates a vertical cross-sectional view of one embodiment of a tower structure and an additive printing device for the manufacturer thereof according to the present disclosure.
Figure 4:
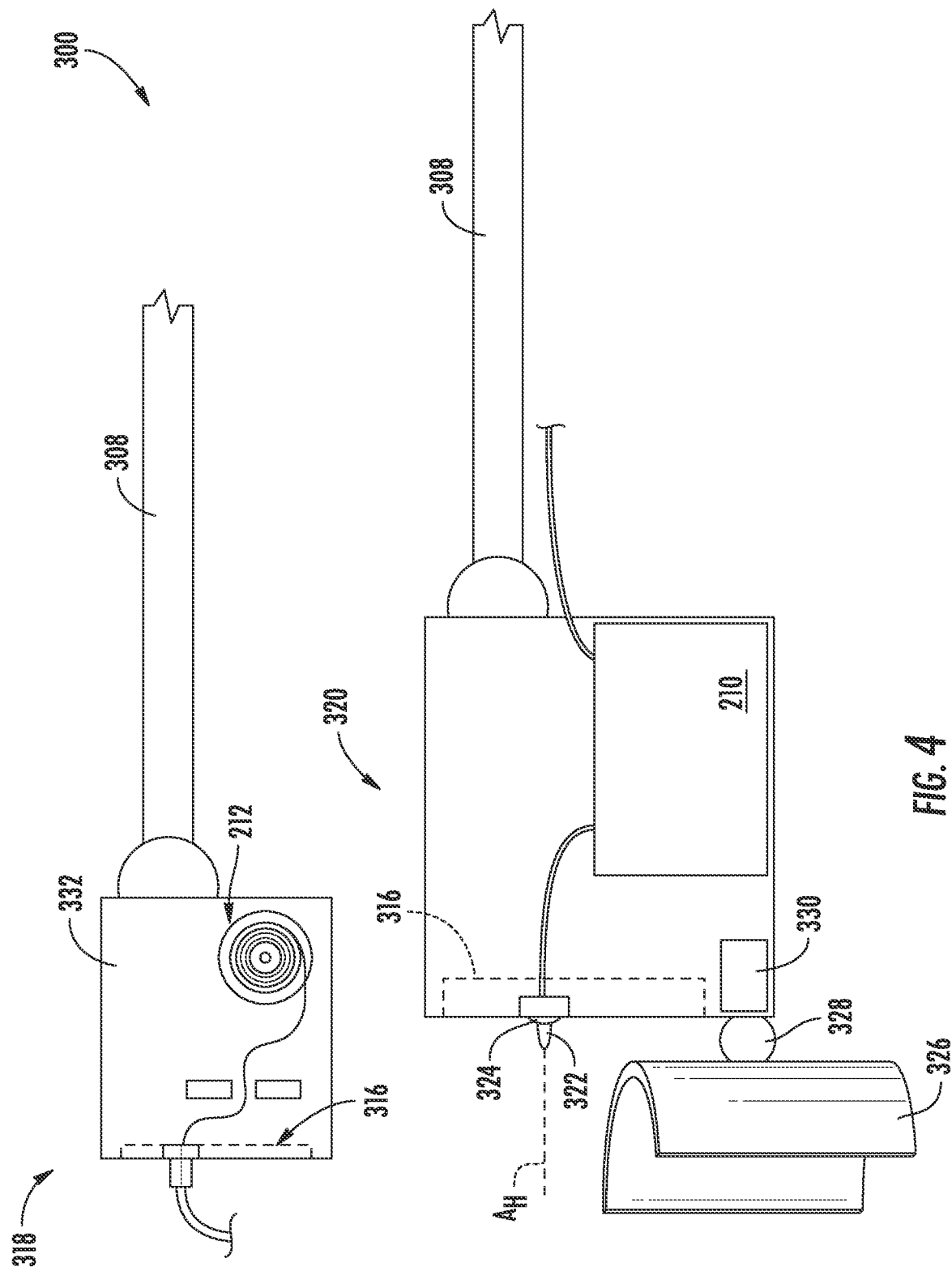
FIG. 4 illustrates a close-up view of certain components of the additive printing device of FIG. 2.
Figure 5:
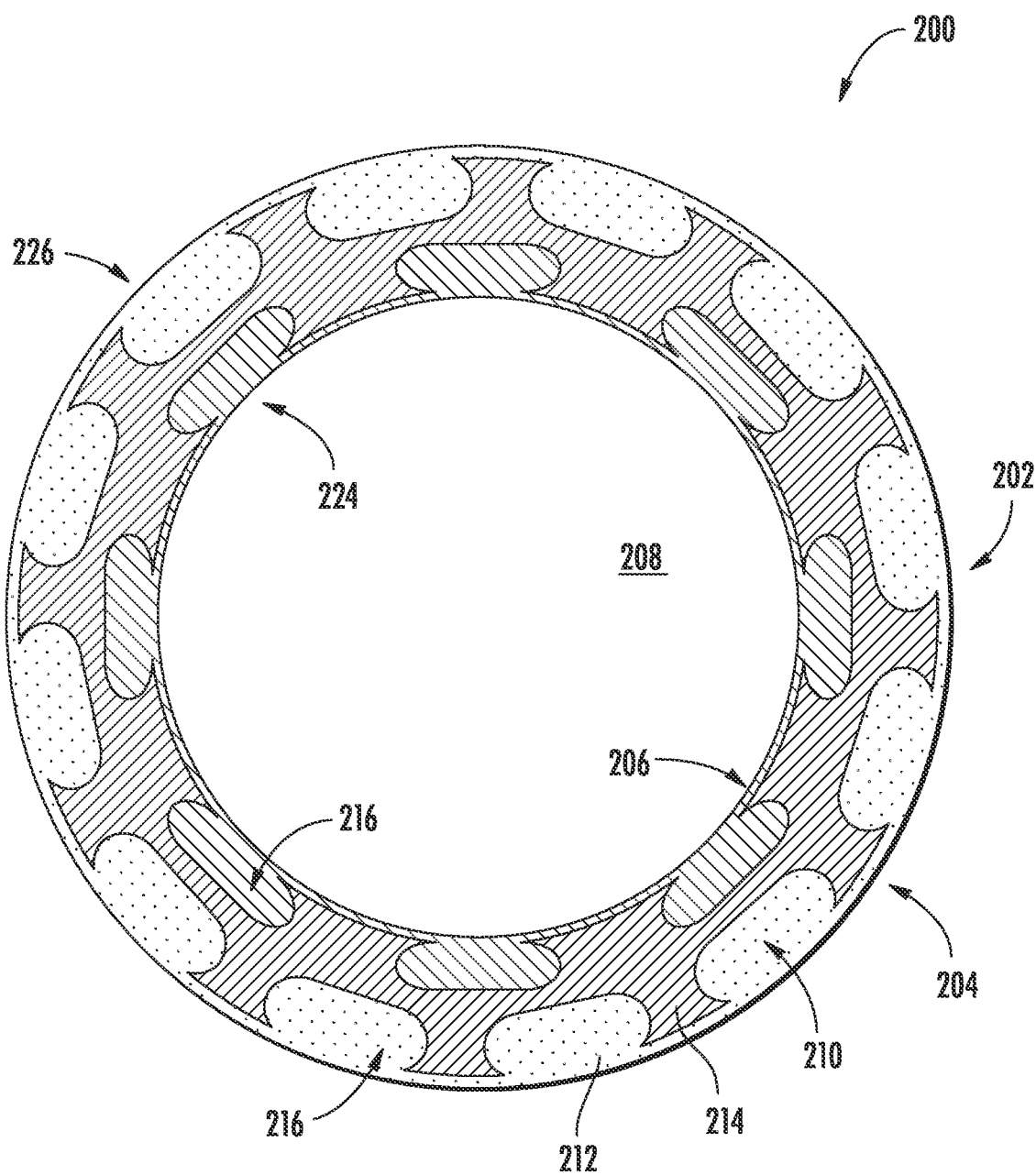
FIG. 5 illustrates a horizontal cross-sectional view of one embodiment of a tower structure according to the present disclosure.

Referring now to FIGS. 2-4, the tower structure 200 may be additively manufactured via the additive printing device 300 according to aspect of the present disclosure. Notably, all or part of the tower structure 200, in particular, the interlocking form ring 214, may be printed layer-by-layer, using the additive printing device 300. The additive printing device 300 may use any suitable means for depositing layers of additive material, such as concrete, to form the tower structure 200. Thus, aspects of the present subject matter are directed to methods for manufacturing a tower structure, such as a wind turbine tower the additive manufacturing. Additive manufacturing, as used herein, is generally understood to encompass processes used to synthesize three-dimensional objects in which successive layers of material are formed under computer control to create the objects as such, objects of any size and/or shape can be produced from digital model data. It should be further understood that the additive manufacturing methods of the present disclosure may encompass three degrees of freedom, as well as more than three degrees of freedom, such that the printing techniques are not limited to printing stacked two-dimensional layers, but are also capable of printing curved and/or irregular shapes.

As particularly depicted in FIGS. 2 and 3, in an embodiment, the additive printing device 300 may include a support structure 302. The support structure 302 may extend from the ground or from the support surface 104 along a generally vertical direction (V). In an embodiment, the support structure 302 may include at least one vertical support component 304. The vertical support component(s) 304 may be located radially outward of the tower structure 200. In another embodiment, the vertical support component(s) 304 may be located radially inward of the inner tower wall 224.

In an additional embodiment, such as particularly depicted in FIG. 3, the vertical support component(s) 304 may support a horizontal support component 306. The vertical support component(s) 304 and the horizontal support component 306 may, in an embodiment, be a truss-like structure (e.g. similar to a tower crane) but could be formed in the other suitable manner or have any other configuration according to alternative embodiments. The horizontal support component 306 may, in an embodiment, be rotatable about the vertical support component(s) 304. In an additional embodiment, the horizontal support component 306 may be movably coupled to the vertical support component(s) 304 so as to permit the horizontal support component 306 to move in the vertical direction (V).

In at least one embodiment, the vertical support component(s) 304 may be configured to have a height which increases in step with the tower structure 200 during the manufacturing thereof. In such an embodiment, additional segments may be combined with the vertical support component(s) 304 so as to raise the vertical support structure using a jacking system. In general, the jacking system may be positioned proximate the support surface 104 and may be configured for raising the vertical support component(s) 304 and inserting additional segments.

The support structure 302 may be configured to support at least one support arm 308 movably coupled thereto. In at least one embodiment, the movable support arm(s) 308 may also serve as the horizontal support component 306. The support arm(s) 308 may be configured to position at least one component of the additive printing device 300 adjacent to the tower structure 200. The support arm(s) 308 may also be configured to deliver power, air, cementitious material, form material, or other resources to the supported component. In an additional embodiment, the support arm(s) 308 may also be equipped with at least one sensor 310 for detecting a position of the support arm(s) 308 relative to the tower structure 200.

As depicted in FIGS. 2-4, the additive printing device 300 may include a first printhead assembly 312 supported by the support structure 302. The first printhead assembly 312 may be positioned over the support surface 104 or preceding layers of the interlocking form ring 214 by at least one of the horizontal support component 306 or the support arm(s) 308.

In an embodiment, the first printhead assembly 312 may include a first printhead 314. The first printhead 314 may be oriented in a first direction ($A_V$). The first direction ($A_V$) may, in an embodiment, be a vertical direction. In an additional embodiment, the first direction ($A_V$) may have a deviation from the vertical of less than 45-degrees and may be considered to be a generally vertical direction. Being oriented in the first direction ($A_V$), the first printhead 314 may deposit one or more layers of the interlocking form ring 214. The first printhead assembly 312 may include mechanisms for adjusting the first printhead 314 relative to the tower structure 200. For example, the first printhead assembly 312 may include a rail adjustment mechanism 316 that is configured for fine-tuning the position of the first printhead 314 relative to the tower structure 200. It should be appreciated that the rail adjustment mechanism 316 may include such rails and actuating mechanisms as may be required to affect the position of the first printhead 314. For example, the rail adjustment mechanism 316 may, for example, include linear actuators, servomotors, track conveyor systems, rack and pinion mechanisms, and/or ball-screw linear slides.

As further depicted in FIGS. 2-4, the additive printing device 300 may also include at least one second printhead assembly 318 supported by the support structure 302. The second printhead assembly(s) 318 may be oriented to simultaneously deposit the cementitious material 210 and the reinforcing member(s) 212 at least partially within one or more of the recesses 216. The second printhead assembly(s) 318 may be positioned adjacent to the radially inner face 206 or the radially outer face 204 of the interlocking form ring 214 so as to form the inner and/or outer tower walls 224, 226. It should be appreciated that, in at least one embodiment, the reinforcing member(s) 212 may be manually inserted at least partially within one or more of the recesses 216. It should be further appreciated that the manual insertion may be in addition to or in lieu of the automatic insertion of the reinforcing member(s) 212 by the second printhead assembly(s) 318.

In at least one embodiment, the additive printing device 300 may employ at least the first printhead assembly 312 and the second printhead assembly(s) 318 simultaneously in order to reduce the production time of the tower structure 200. For example, in such an embodiment, the first printhead assembly 312 may be utilized to deposit several starter layers of the interlocking form ring 214 on the support surface 104. Once these starter layers are cured to a degree sufficient to serve as a form for the cementitious material 210, the second printhead assembly(s) 318 may be employed to begin depositing the cementitious material 210 and the reinforcing member(s) 212 within the plurality of recesses 216 while the first printhead assembly 312 continues to deposit additional layers of the interlocking form ring 214. As the interlocking form ring 214 advances in height, the second printhead assembly 218 may continue advancing up the interlocking form ring 214 in concert with the first printhead assembly 312. It should be appreciated that depositing the cementitious material 210 simultaneously with the deposition of additional layers of the interlocking form ring 214 may reduce the production time of the tower structure 200 when compared to approaches requiring the completion of a form structure prior to the addition of a cementitious material.

Referring still to FIGS. 2-4, in an embodiment, the second printhead assembly(s) 318 may include a second printhead 320. The second printhead 320 may be oriented in a second direction ($A_H$). The second direction ($A_H$) may, in an embodiment, be a horizontal direction. In an additional embodiment, the second direction ($A_H$) may have a deviation from the horizontal of 45-degrees or less and may be considered to be a generally horizontal direction. Being oriented in the second direction ($A_H$), the second printhead 320 may deposit the cementitious material 210 within the plurality of recesses 216 so as to form the inner and/or outer tower walls 224, 226.

The second printhead 320 may also include at least one deposition nozzle 322. The deposition nozzle(s) 322 may be coupled to an articulation component 324. The articulation component 324 may permit the directing of the deposition of the cementitious material 210 without a corresponding movement in the second printhead 320. For example, the articulation component 324 may, for example, permit the deposition of the cementitious material 210 to the maximal recess width 220 by permitting the deposition nozzle(s) 322 to the traverse an arc along a generally horizontal plane while the second printhead 320 remains relatively stationary with reference to the tower structure 200.

The second printhead assembly(s) 318 may also include additional mechanisms for adjusting the deposition nozzle(s) 322 relative to the tower structure 200. For example, the second printhead assembly(s) 318 may include a rail adjustment mechanism 316 that is configured for fine-tuning the position of the deposition nozzle(s) 322 relative to the tower structure 200. It should be appreciated that the rail adjustment mechanism 316 may include such rails and actuating mechanisms as may be required to affect the position of the deposition nozzle(s) 322. For example, the rail adjustment mechanism 316 may, for example, include linear actuators, servomotors, track conveyor systems, rack and pinion mechanisms, and/or ball-screw linear slides. In at least one embodiment, the rail adjustment mechanism 316 may be oriented in a first direction so as to permit a vertical movement of the deposition nozzle(s) 322 while maintaining a generally horizontal orientation of the deposition nozzle(s) 322.

Referring still to FIGS. 2-4, in an embodiment, the second printhead assembly(s) 318 may include an articulable forming element 326. The articulable forming element 326 may be positioned so as to provide a slip form during the curing of the cementitious material 210. The articulable forming element 326 may be coupled to the second printhead assembly via an articulating joint 328 and at least one form actuator 330. In an embodiment, the articulable forming element 326 may be formed so as to correspond to the shape and circumference of the tower structure 200. In an alternative embodiment, the articulable forming element 326 may be adjustable in shape and size so as to correspond to the shape and circumference of the tower structure 200 in the region where the second printhead assembly 318 may be depositing the cementitious material 210.

In another embodiment, the articulable forming element 326 may be advanced at a rate which permits the cementitious material 210 to set by the time the cementitious material 210 emerges from an edge of the articulable forming element 326. In an embodiment, the second printhead assembly(s) 318 and the articulable forming element 326 may advance up the pocket(s) 222 as the tower structure 200 increases in height. In at least one alternative embodiment, the second printhead assembly 218 and the articulable forming element 326 may advance circumferentially about the tower structure 200 depositing the cementitious material 210 in the plurality of recesses 216. It should be appreciated that the use of a slip form may, in at least one embodiment, permit the deposition of the cementitious material 210 in a continuous manner as opposed to a piecewise construction. The use of the articulable forming element 326 as a slip form may also result in an inner and/or outer tower wall 224, 226 which is essentially smooth. Such a finish may require little to no additional processing in order to achieve a desired finish for the tower structure 200. It should be further appreciated that the articulable forming element 326 may be constructed of a metal, a plastic, a composite, or any other material selected to provide the support for the uncured cementitious material 210 as well as providing the desired surface finish as the articulable forming element 326 advances up and/or across the tower structure 200.

In an embodiment, the second printhead assembly(s) 318 may include a reinforcement module 332. The reinforcement module 332 may be synchronized with the second printhead 320 and configured to embed at least one reinforcing member(s) 212 at least partially within the recess 216. In at least one embodiment, the reinforcement module 332 may be coupled to the support structure 302 via the support arm(s) 308. In such an embodiment, the reinforcement module 332 may be positioned adjacent the same pocket 222 as the second printhead 320 and may advance along the pocket 222 in concert with the second printhead 320. As such, the reinforcement module 332 may embed the reinforcing member(s) 212 in the pocket 222 just prior to the deposition of the cementitious material 210 in the same pocket 222 by the second printhead 320. In an additional embodiment, the reinforcement module 332 may be coupled to the second printhead 320 such that the second printhead assembly(s) 318 forms a unitary component including the second printhead 320 and the reinforcement module 332.

In an additional embodiment, the reinforcement module 332 may support a coil or role of the reinforcement member(s) 212. The reinforcement module 332 may be positioned adjacent the second printer had 320 and configured for unwinding the coil and rolling the reinforcement member(s) 212 into the print area of the recess 216 prior to depositing the cementitious material 210 such that the reinforcement member(s) 212 becomes embedded within, or printed over with, the cementitious material 210. Additionally, in an embodiment, the reinforcement module 332 may include the rail adjustment mechanism 316. In yet in an additional embodiment, the reinforcement module 332 may be further configured to apply a force to the reinforcement member(s) 212 so as to post-tension the reinforcement member(s) 212.

Referring still to FIGS. 2-4, in an embodiment, the second printhead assembly(s) 318 may include a plurality of the deposition nozzles 322 and each of the deposition nozzles 322 may be independently articulable. The second printhead assembly(s) 318 may also include a plurality of reinforcement modules 332. The second printhead assembly(s) 318 may span at least two circumferentially spaced recesses 216 so as to simultaneously deposit the cementitious material 210 and the reinforcing member(s) 212 in each of the at least two recesses. For example, in an embodiment, the second printhead assembly(s) 318 may be configured to simultaneously span multiple pockets 222 in a quadrant of the tower structure so as to permit the cementitious material 210 and the reinforcement member(s) 212 to be simultaneously deposited in each of the pockets 222 in the quadrant. In an additional embodiment, the second printhead assembly(s) 318 may span an arc including half of the circumference of the tower structure 200 and the pockets 222 contained therein. It should be appreciated the simultaneous deposition of the cementitious material 210 in multiple pockets 222 may serve to increase the rate at which the tower structure 200 is manufactured.

In at least one embodiment, such as particularly depicted in FIG. 3, the additive printing device 300 may include at least one third printhead assembly 334. The third printhead assembly(s) 334 may include a third printhead 336 oriented in a generally horizontal ($A_H$) direction to simultaneously deposit the cementitious material 210 within one or more of the plurality of recesses 216. The third printhead assembly(s) 334 may be disposed radially opposite the second printhead assembly(s) 318 so that the inner tower wall 224 may be formed simultaneously with the outer tower wall 226. In an embodiment, the third printhead 336 may include the deposition nozzle(s) 322 coupled to the articulation component 324 and the articulable forming element 326 as described herein. It should be appreciated that in at least one embodiment, the third printhead assembly(s) 334 may also include the reinforcement module 332 so as to facilitate the deposition of the reinforcing member(s) 212 at least partially within the recess 216.

Referring still to FIG. 3, in at least one embodiment, the additive printing device 300 may also include a fourth printhead assembly 338. The fourth printhead assembly 338 may be operably coupled to the support structure 302. The fourth printhead assembly 338 may include a fourth printhead 340 oriented in a first direction ($A_V$). Being oriented in a first direction ($A_V$), the fourth printhead 340 may deposit one or more layers of the interlocking form ring 214. The fourth printhead assembly 338 may be disposed radially opposite the first printhead assembly 312 it should be appreciated that employing the fourth printhead assembly 338 simultaneously with the first printhead assembly 312 may decrease a required build time for the tower structure 200. In at least one embodiment, such as depicted in FIG. 3, the required build time may be further reduced through employment of the first, second, third, and fourth printhead assemblies 314, 318, 334, 338 simultaneously.

Figure 7:
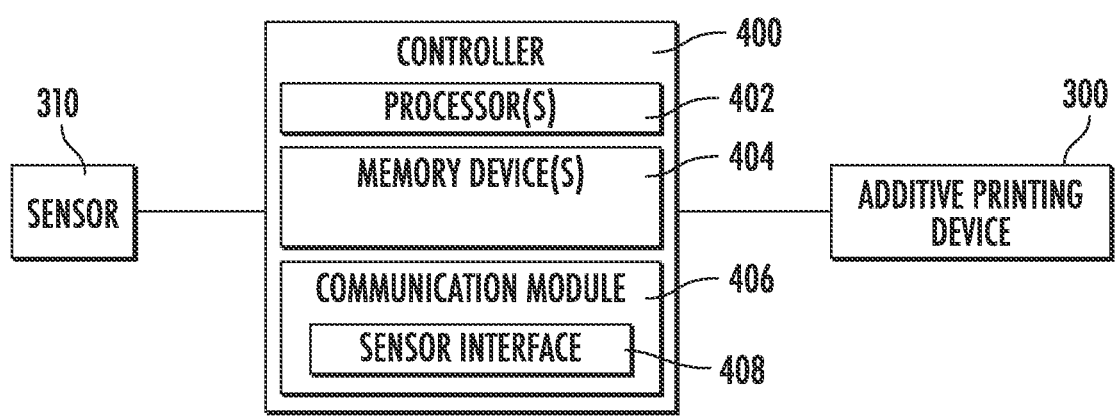
FIG. 7 illustrates a schematic diagram of a controller for use with additive printing device of FIG. 2.

As shown particularly in FIG. 7, a schematic diagram of one embodiment of suitable components of a controller 400 that may control the additive printing device 300 is illustrated. For example, as shown, the controller 400 may include one or more processor(s) 402 and associated memory device(s) 404 configured to perform a variety of computer-implemented functions (e.g., performing the methods, steps, calculations and the like and storing relevant data as disclosed herein). Additionally, the controller 400 may also include a communications module 406 to facilitate communications between the controller 400 and the various components of the additive printing device 300. Further, the communications module 406 may include a sensor interface 408 (e.g., one or more analog-to-digital converters) to permit signals transmitted from one or more sensors 310 to be converted into signals that can be understood and processed by the processors 402. It should be appreciated that the sensor(s) 310 may be communicatively coupled to the communications module 406 using any suitable means, such as a wired or a wireless connection. Additionally, the communications module 406 may also be operably coupled to a component of the additive printing device 300 so as to orchestrate the formation of the tower structure 200.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 400 for may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 404 may generally be configured to store suitable computer-readable instructions that, when implemented by the processor(s) 402, configure the controller 400 to perform various functions including, but not limited to, manufacturing a tower structure, as described herein, as well as various other suitable computer-implemented functions.

Figure 6:
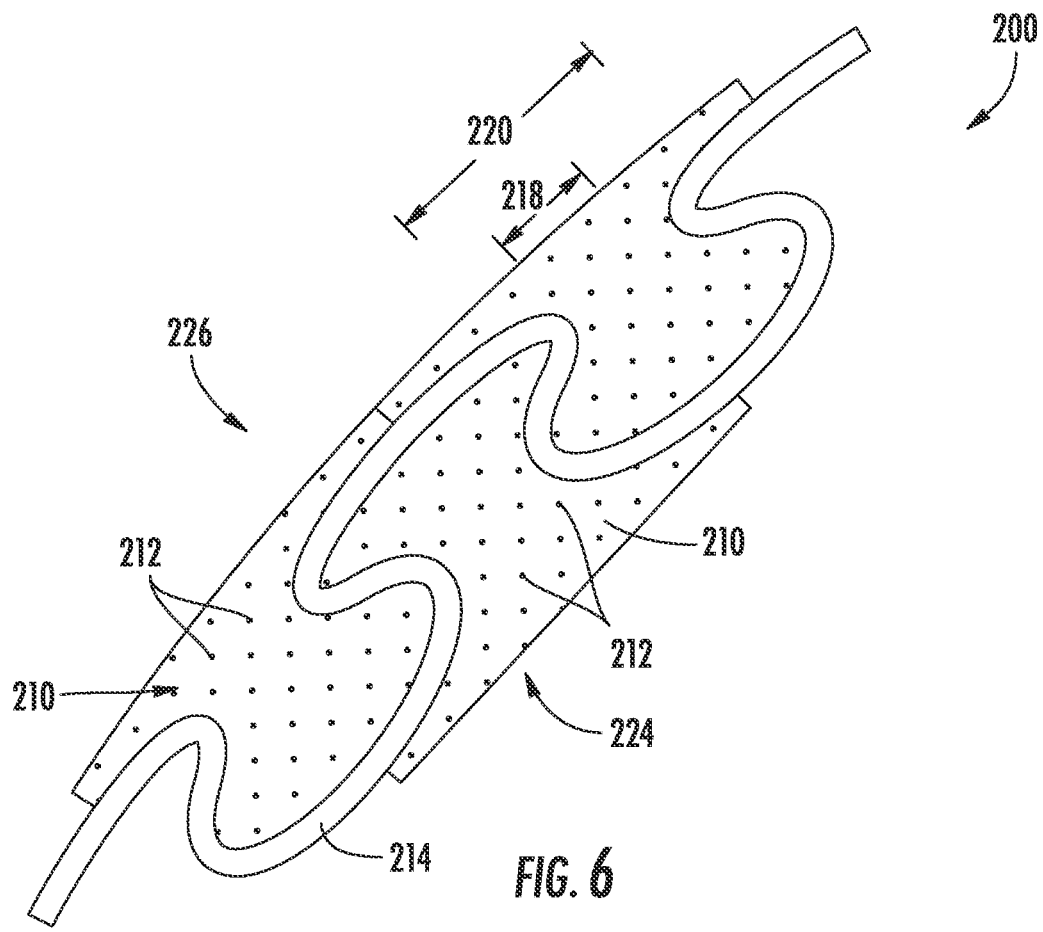
FIG. 6 illustrates a close-up view of a portion of the cross-section of FIG. 5.

Referring now to FIG. 8, a flow diagram of one embodiment of a method 500 for controlling a wind farm is illustrated. The method 500 may be implemented using, for instance, the additive printing device 300 of the present disclosure discussed above with references to FIGS. 2-4 to manufacture of the tower structure of FIGS. 1-3, 5, and 6. FIG. 8 depicts steps performed in a particular order for purposes of illustration and discussion. Those of ordinary skill in the art, using the disclosures provided herein, will understand that various steps of the method 500, or any of the methods disclosed herein, may be adapted, modified, rearranged, performed simultaneously, or modified in various ways without deviating from the scope of the present disclosure.

As shown at (502), the method 500 may include depositing one or more layers of an interlocking form ring with a first printhead assembly. The interlocking form ring may define a plurality of recesses in at least one of a radially inner face or a radially outer face. The first printhead assembly may include at least a first printhead oriented in a first direction. As shown at (504), the method 500 may include depositing a cementitious material within one or more of the plurality of recesses with a second printhead assembly so as to form at least one of an inner tower wall or an outer tower wall. The second printhead assembly may include a second printhead oriented in a second direction. The second direction may be different than the first direction. As shown at (506), the method 500 may include positioning at least one reinforcing member at least partially within the recess with the second printhead assembly. Additionally, as shown at (508), the method 500 may include positioning an articulable forming element of the second printhead assembly adjacent to the cementitious material during the curing thereof so as to provide a slip form for the curing of the cementitious material.

In an additional embodiment, the method 500 may also include defining the plurality of recesses in the radially inner face of the interlocking form ring and the radially outer face of the interlocking form ring.

In an embodiment, the method 500 may also include simultaneously depositing the cementitious material at least partially within one or more of the plurality of recesses with a third printhead assembly. The third printhead assembly may be disposed radially opposite the second printhead assembly. The third printhead assembly may include a third printhead oriented in the second direction.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method of manufacturing a tower structure, the method comprising depositing one or more layers of an interlocking form ring with a first printhead assembly, the interlocking form ring defining a plurality of recesses in at least one of a radially inner face or a radially outer face, the first printhead assembly including, at least, a first printhead oriented in a first direction; depositing a cementitious material within one or more of the plurality of recesses with a second printhead assembly so as to form at least one of an inner tower wall or an outer tower wall, the second printhead assembly including a second printhead oriented in a second direction, the second direction being different than the first direction; positioning at least one reinforcing member at least partially within the recess with the second printhead assembly; and positioning an articulable forming element of the second printhead assembly adjacent to the cementitious material during curing thereof so as to provide a slip form for the curing of the cementitious material.

Clause 2. The method of any preceding clause, further comprising defining the plurality of recesses in the radially inner face of the interlocking form ring and the radially outer face of the interlocking form ring.

Clause 3. The method of any preceding clause, further comprising simultaneously depositing the cementitious material at least partially within one or more of the plurality recesses with a third printhead assembly, the third printhead assembly being disposed radially opposite the second printhead assembly, the third printhead assembly including a third printhead oriented in the second direction.

Clause 4. The method of any preceding clause, wherein positioning the at least one reinforcing member further comprises positioning the at least one reinforcing member with a reinforcement module synchronized with the second printhead, the second printhead assembly being coupled to a support arm via an articulable joint.

Clause 5. The method of any preceding clause, wherein depositing the cementitious material within the one or more plurality of recesses further comprises depositing the cementitious material with a plurality of deposition nozzles of the second printhead, wherein each nozzle of the plurality of deposition nozzles is independently articulable.

Clause 6. The method of any preceding clause further comprises simultaneously depositing the cementitious material and the at least one reinforcing member in each of at least two recesses of the plurality of recesses.

Clause 7. The method of any preceding clause, wherein depositing one or more layers of the interlocking form ring further comprises depositing one or more layers of a form material having a first cure rate, and wherein the cementitious material has a second cure rate, the first cure rate being different than the second cure rate.

Clause 8. The method of any preceding clause, wherein one or more of the plurality of recesses further comprise a plurality of helical pockets circumscribing the interlocking form ring.

Clause 9. The method any preceding clause, wherein one or more of the plurality of recesses further comprise a dovetail cross-sectional shape.

Clause 10. The method of any preceding clause, wherein positioning the at least one reinforcing member further comprises depositing at least one of a wire, cable, ribbon, or microfiber from a coil supported by a reinforcement module of the second printhead assembly.

Clause 11. The method of any preceding clause, further comprising applying a force to the at least one reinforcement member so as to tension the at least one reinforcement member.

Clause 12. The method of any preceding clause, further comprising sealing at least one of the radially inner face or the radially outer face of the interlocking form ring with the cementitious material.

Clause 13. The method of any preceding clause, wherein the tower structure is part of a wind turbine.

Clause 14. An additive printing device for manufacturing a tower structure, the additive printing device comprising a support structure; a first printhead assembly operably coupled to the support structure, the first printhead assembly including a first printhead oriented in a first direction to deposit one or more layers of an interlocking form ring, the interlocking form ring defining a plurality of recesses in at least one of a radially inner tower wall or a radially outer tower wall; and a second printhead assembly oriented to simultaneously deposit a cementitious material and at least one reinforcing member at least partially within one or more recesses of the plurality of recesses, wherein the cementitious material forms at least one of an inner tower wall or an outer tower wall, the second printhead assembly comprising a second printhead oriented in a second direction with the second direction being different than the first direction, the second printhead further comprising an articulable forming element positioned so as to provide a slip-form during the curing of the cementitious material; and a reinforcement module synchronized with the second printhead and configured to embed at least one reinforcing member at least partially within the recess of the plurality of recesses.

Clause 15. The additive printing device of any preceding clause, further comprising a third printhead assembly including a third printhead oriented in a second direction to simultaneously deposit the cementitious material within one or more of the plurality of recesses, wherein the cementitious material forms the inner tower wall, the third printhead assembly being disposed radially opposite the second printhead assembly.

Clause 16. The additive printing device of any preceding clause, further comprising a fourth printhead assembly operably coupled to the support structure, the fourth printhead assembly including a fourth printhead oriented in a first direction to deposit one or more layers of the interlocking form ring, the fourth printhead being disposed radially opposite the first printhead assembly, and a third printhead assembly including a third printhead oriented in a second direction to simultaneously deposit the cementitious material within one or more of the plurality of recesses, wherein the cementitious material forms the inner tower wall, the third printhead assembly being disposed radially opposite the second printhead assembly.

Clause 17. The additive printing device of any preceding clause, wherein the reinforcement module is coupled to the second printhead so as to form a unitary component, the second printhead assembly being coupled to a support arm via an articulable joint.

Clause 18. The additive printing device of any preceding clause, wherein the second printhead further comprises a plurality of deposition nozzle, each nozzle of the plurality of deposition nozzles being independently articulable.

Clause 19. The additive printing device of any preceding clause, wherein the second printhead assembly further comprises a plurality of reinforcement modules, and wherein the second printhead assembly spans at least two recesses of the plurality of recesses so as to simultaneously deposit the cementitious material and the at least one reinforcing member in each of the at least two recesses.

Clause 20. A method of manufacturing a wind turbine tower structure, the method comprising depositing one or more layers of an interlocking form ring with a first printhead assembly, the interlocking form ring defining a plurality of recesses in at least one of a radially inner face or a radially outer face, the first printhead assembly including, at least, a first printhead oriented in a first direction, depositing a cementitious material within one or more of the plurality of recesses with a second printhead assembly so as to form at least one of an inner tower wall or an outer tower wall, the second printhead assembly including a second printhead oriented in a second direction, the second direction being different than the first direction; and positioning at least one reinforcing member at least partially within the recess with the second printhead assembly.

What is claimed is:
1. A method of manufacturing a tower structure, the method comprising:
depositing one or more layers of an interlocking form ring with a first printhead assembly, the interlocking form ring defining a plurality of recesses in at least one of a radially inner face or a radially outer face, the first printhead assembly including, at least, a first printhead oriented in a first direction;
depositing a cementitious material within one or more of the plurality of recesses with a second printhead assembly so as to form at least one of an inner tower wall or an outer tower wall, the second printhead assembly including a second printhead oriented in a second direction transverse to the first direction;
positioning at least one reinforcing member at least partially within the recess with the second printhead assembly; and positioning an articulable forming element of the second printhead assembly below a point of deposition of the cementitious material, the articulable forming element having a shape corresponding to a shape of the inner or outer tower wall so as to provide a temporary slip form for the curing of the cementitious material as the second printhead moves in the second direction to deposit the cementitious material within the recesses, the articulatable forming element movable with the second printhead vertically along the inner or outer tower wall.

2. The method of claim 1, further comprising defining the plurality of recesses in the radially inner face of the interlocking form ring and the radially outer face of the interlocking form ring.

3. The method of claim 1, wherein the tower structure is part of a wind turbine.

4. The method of claim 1, wherein positioning the at least one reinforcing member further comprises positioning the at least one reinforcing member with a reinforcement module synchronized with the second printhead, the second printhead assembly being coupled to a support arm via an articulable joint.

5. The method of claim 1, wherein depositing the cementitious material within the one or more plurality of recesses further comprises depositing the cementitious material with a plurality of deposition nozzles of the second printhead, wherein each nozzle of the plurality of deposition nozzles is independently articulable.

6. The method of claim 5, further comprises simultaneously depositing the cementitious material and the at least one reinforcing member in each of at least two recesses of the plurality of recesses.

7. The method of claim 1, wherein depositing one or more layers of the interlocking form ring further comprises depositing one or more layers of a form material having a first cure rate, and wherein the cementitious material has a second cure rate, the first cure rate being different than the second cure rate.

8. The method of claim 1, wherein one or more of the plurality of recesses further comprise a plurality of helical pockets circumscribing the interlocking form ring.

9. The method of claim 1, wherein one or more of the plurality of recesses further comprise a dovetail cross-sectional shape.

10. The method of claim 1, wherein positioning the at least one reinforcing member further comprises depositing at least one of a wire, cable, ribbon, or microfiber from a coil supported by a reinforcement module of the second printhead assembly.

11. The method of claim 1, further comprising:
applying a force to the at least one reinforcement member so as to tension the at least one reinforcement member.

12. The method of claim 1, further comprising:
sealing at least one of the radially inner face or the radially outer face of the interlocking form ring with the cementitious material.

13. A method of manufacturing a tower structure, the method comprising:
depositing one or more layers of an interlocking form ring with a first printhead assembly, the interlocking form ring defining a plurality of recesses in at least one of a radially inner face or a radially outer face, the first printhead assembly including, at least, a first printhead oriented in a first direction;

depositing a cementitious material within one or more of the plurality of recesses with a second printhead assembly so as to form at least one of an inner tower wall or an outer tower wall, the second printhead assembly including a second printhead oriented in a second direction, the second direction being different than the first direction;

positioning at least one reinforcing member at least partially within the recess with the second printhead assembly;

positioning an articulable forming element of the second printhead assembly adjacent to the cementitious material during curing thereof so as to provide a slip form for the curing of the cementitious material; and simultaneously depositing the cementitious material at least partially within one or more of the plurality recesses with a third printhead assembly, the third printhead assembly being disposed radially opposite the second printhead assembly, the third printhead assembly including a third printhead oriented in the second direction.

* * * * *